(12) United States Patent
Brown et al.

(10) Patent No.: US 8,668,764 B2
(45) Date of Patent: Mar. 11, 2014

(54) MOF NANOCRYSTALS

(75) Inventors: Andrew Brown, Atlanta, GA (US); Sankar Nair, Atlanta, GA (US); David Sholl, Atlanta, GA (US); Cantwell Carson, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 175 days.

(21) Appl. No.: 13/399,645

(22) Filed: Feb. 17, 2012

(65) Prior Publication Data

US 2012/0247328 A1 Oct. 4, 2012

Related U.S. Application Data

(60) Provisional application No. 61/471,234, filed on Apr. 4, 2011.

(51) Int. Cl.
*B01D 53/22* (2006.01)

(52) U.S. Cl.
USPC .................. 95/51; 95/43; 95/45; 96/7; 96/11

(58) Field of Classification Search
CPC . Y02C 10/10; B01D 53/228; B01D 2257/504
USPC .................................. 95/43, 45, 51; 96/7, 11
See application file for complete search history.

(56) References Cited

U.S. PATENT DOCUMENTS

| | | | |
|---|---|---|---|
| 6,953,493 B2 | 10/2005 | Nakayama et al. | |
| 7,014,680 B2 | 3/2006 | Nakayama et al. | |
| 7,553,352 B2 * | 6/2009 | Mueller et al. | 95/90 |
| 7,880,026 B2 * | 2/2011 | Ni et al. | 556/110 |
| 7,973,090 B2 | 7/2011 | Suzuki et al. | |
| 8,123,834 B2 * | 2/2012 | Masel et al. | 95/90 |
| 8,269,029 B2 * | 9/2012 | Masel et al. | 556/132 |
| 8,518,153 B2 * | 8/2013 | Ryan et al. | 95/127 |
| 2002/0031303 A1 * | 3/2002 | Wang | 385/39 |
| 2004/0139908 A1 | 7/2004 | Bowe et al. | |
| 2004/0173094 A1 | 9/2004 | Nakayama et al. | |
| 2005/0204916 A1 | 9/2005 | Falconer et al. | |
| 2005/0233945 A1 | 10/2005 | Brown et al. | |
| 2006/0201884 A1 | 9/2006 | Kulprathipanja et al. | |
| 2007/0022877 A1 | 2/2007 | Marand et al. | |
| 2007/0244347 A1 | 10/2007 | Ying et al. | |
| 2008/0047432 A1 | 2/2008 | Nonaka et al. | |
| 2008/0177098 A1 * | 7/2008 | Bahnmuller et al. | 556/118 |
| 2008/0214686 A1 | 9/2008 | Suzuki et al. | |
| 2008/0261101 A1 | 10/2008 | de Figueiredo Gomes et al. | |
| 2009/0004084 A1 | 1/2009 | Bell et al. | |
| 2009/0011926 A1 | 1/2009 | Yajima et al. | |
| 2009/0060839 A1 * | 3/2009 | Boyes et al. | 424/9.1 |
| 2009/0111959 A1 | 4/2009 | Cao et al. | |

(Continued)

OTHER PUBLICATIONS

Ma et al. "Microporous Pillared Paddle-Wheel Frameworks Based on Mixed-Ligand Coordination of Zinc Ions," Inorg. Chem. 2005,44,4912-4914.*

(Continued)

*Primary Examiner* — Jason M Greene
*Assistant Examiner* — Anthony Shumate
(74) *Attorney, Agent, or Firm* — Gardere Wynne Sewell LLP; Teresa J. Lechner-Fish (57) ABSTRACT

MOF nanocrystals having a narrow size distribution, as well as methods of making and using same are disclosed.

27 Claims, 5 Drawing Sheets

(56) References Cited

U.S. PATENT DOCUMENTS

| | | | |
|---|---|---|---|
| 2009/0131643 A1 | 5/2009 | Ni et al. | |
| 2009/0152755 A1 | 6/2009 | Liu et al. | |
| 2009/0155464 A1 | 6/2009 | Liu et al. | |
| 2009/0211440 A1 | 8/2009 | Reyes et al. | |
| 2010/0006503 A1 | 1/2010 | Bratton et al. | |
| 2010/0072424 A1* | 3/2010 | Petoud et al. | 252/301.16 |
| 2010/0132549 A1 | 6/2010 | Yaghi et al. | |
| 2010/0144512 A1 | 6/2010 | Uchikawa et al. | |
| 2010/0226991 A1* | 9/2010 | Horcajada-Cortes et al. | 424/489 |
| 2011/0160039 A1 | 6/2011 | Himeno et al. | |
| 2011/0298115 A1 | 12/2011 | Celaya et al. | |
| 2011/0319630 A1* | 12/2011 | Yaghi et al. | 548/109 |
| 2012/0003475 A1* | 1/2012 | Benin et al. | 428/402 |
| 2012/0070904 A1 | 3/2012 | Stoddart et al. | |
| 2012/0202006 A1 | 8/2012 | Rimer | |
| 2013/0157837 A1* | 6/2013 | Banerjee et al. | 502/5 |
| 2013/0197235 A1* | 8/2013 | Thompson et al. | 548/103 |

OTHER PUBLICATIONS

Forster et al. "A High-Throughput Investigation of the Role of pH, Temperature, Concentration, and Time on the Synthesis of Hybrid Inorganic-Organic Materials," Angew. Chem. Int. Ed. 2005,44, 7608-7611.*
Lin et al. "Chiral Induction in the Ionothermal Synthesis of a 3-D Coordination Polymer," J. Am. Chem. Soc. 2007, 129, 4880-4881.*
Lee et al. "Thermodynamic and kinetic factors in the hydrothermal synthesis of hybrid frameworks: zinc 4-cyclohexene-1,2-dicarboxylates," Chem. Commun., 2006,2687-2689.*
Yaghi, O. Met al., J. Nature 2003,423, 705, p. 705-714.
Watanabe, T. et al., Phys. Chem. Chem. Phys. 2009, 11, 11389, pp. 11389-11394.
Ranjan, R.; Tsapatsis, M. Chemistry of Materials 2009, 21, 4920.
Pan, L., et al., J. Am. Chem. Soc. 2004,126, 1308, pp. 1308-1309.
Li, Z. et al., Mater. Lett. 2009, 63, 78, pp. 78-80.
Chen, B. L., et al., Chem.-Int. Edit. 2006,45,1390, pp. 1390-1393.
Ma, B. Q., et al., Inorganic Chemistry 2005, 44, 4912, No. 14 pp. 4912-4914.
Forster, P. M., et al., Chem.-Int. Edit. 2005,44, 7608, pp. 7608-7611.
Aguado, Sonia, et al., *Facile synthesis of an ultramicroporous MOF tubular membrane with selectivity towards $CO_2$*, New J. Chem., 2011, 35, pp. 41-44.
Bae, Tae-Hyun, et al., *A high-performance gas-separation membrane containing submicrometer-sized metal-organic framework crystals*, Angew. Chem. Int. Ed., 2010, 49, pp. 9863-9866.
Baker, Richard W., *Future directions of membrane gas separation technology*, Ind. Eng. Chem. Res., 2002, 41(6), pp. 1393-1411.
Baker, Richard W. and Kaaeid Lokhandwala, *Natural gas processing with membranes: An overview*, Ind. Eng. Chem. Res., 2008, 47(7), pp. 2109-2121.
Brar, Tejinder, et al., *Control of crystal size and distribution of zeolite A*, Ind. Eng. Chem. Res., 2001, 40, pp. 1133-1139.
Bux, Helge, et al., *Oriented zeolitic imidazolate framework-8 membrane with sharp $H_2/C_3H_8$ molecular sieve separation*, Chem. Mater., 2011, 23, pp. 2262-2269.
Bux, Helge, et al., *Zeolitic imidazolate framework membrane with molecular sieving properties by microwave-assisted solvothermal synthesis*, J. Am. Chem. Soc., 2009, 131(44), pp. 16000-16001.
Caro, Jüergen and Manfred NOACK, *Zeolite membranes—Recent developments and progress*, Micropor. Mesopor. Mater., 2008, 115, pp. 215-233.
Carreon, Moises A., et al., *Alumina-supported SAPO-34 membranes for $CO_2/CH_4$ separation*, J. Am. Chem. Soc., 2008, 130(16), pp. 5412-5413.
Centrone, A., et al., *Growth of metal-organic frameworks on polymer surfaces*, J. Am. Chem. Soc., 2010, 132(44), pp. 15687-15691.
Chiu, W. V., et al., *Post-synthesis defect abatement of inorganic membranes for gas separation*, J. Membr. Sci., 2011, 377, pp. 182-190.
Choi, Jungkyu, et al., *Grain boundary defect elimination in a zeolite membrane by rapid thermal processing*, Science, 2009, 325, pp. 590-593.
Cui, Ying, et al., *Preparation and gas separation properties of zeolite T membrane*, Chem. Comm., 2003, 17, pp. 2154-2155.
Cui, Ying, et al., *Preparation and gas separation performance of zeolite T membrane*, J. Mater. Chem., 2004, 14(5), pp. 924-932.
Den Exter, M.J., et al., *Separation of permanent gases on the all-silica 8-ring clathrasil DD3R*, (Weitkamp, J., et al, eds. Zeolites and Related Microporous Materials: State of the Art 1994), Studies in Surface Science and Catalysis, (1994), vol. 84, pp. 1159-1166.
Favre, Eric, *Carbon dioxide recovery from post-combustion processes: Can gas permeation membranes compete with absorption?*, J. Membr. Sci., 2007, 294, pp. 50-59.
Gascon, Jorge, et al., *Accelerated synthesis of all-silica DD3R and its performance in the separation of propylene/propane mixtures*, Micropor. Mesopor. Mater., 2008, 115, pp. 585-593.
Ge, Qinqin, et al., *High-performance zeolite NaA membranes on polymer-zeolite composite hollow fiber supports*, J. Am. Chem. Soc., 2009, 131(47), pp. 17056-17057.
Gies, H., *Studies on clathrasils. IX crystal structure of deca-dodecasil 3R, the missing link between zeolites and clathrasils*, Zeitschrift für Kristallographie, 1986, 175, pp. 93-104.
Hao, Ji Hua and Shichang Wang, *Influence of quench medium on the structure and gas permeation properties of cellulose acetate membranes*, J. Appl. Polym. Sci., 1998, 68(8), pp. 1269-1276.
Heng, Samuel, et al., *Low-temperature ozone treatment for organic template removal from zeolite membrane*, J. Membr. Sci., 2004, 243, pp. 69-78.
Himeno, Shuji, et al., *Characterization and selectivity for methane and carbon dioxide adsorption on the all-silica DD3R zeolite*, Micropor. Mesopor. Mater., 2007, 98, pp. 62-69.
Himeno, Shuji, et al., *Synthesis and permeation properties of a DDR-type zeolite membrane for separation of $CO_2/CH_4$ gaseous mixtures*, Ind. Eng. Chem. Res., 2007, 46(21), pp. 6989-6997.
Huang, Aisheng, et al., *Molecular-sieve membrane with hydrogen permselectivity: ZIF-22 in LTA topology prepared with 3-aminopropyltriethoxysilane as covalent linker*, Angew. Chem. Int. Ed., 2010, 49, pp. 4958-4961.
Huang, Aisheng, et al., *Steam-stable zeolitic imidazolate framework ZIF-90 membrane with hydrogen selectivity through covalent functionalization*, J. Am. Chem. Soc. 2010, 132(44), pp. 15562-15564.
Huang, Aisheng and Jürgen Caro, *Cationic polymer used to capture zeolite precursor particles for the facile synthesis of oriented zeolite LTA molecular sieve membrane*, Chem. Mater., 2010, 22(15), pp. 4353-4355.
Huang, Aisheng, & Jürgen Caro, *Covalent post-functionalization of zeolitic imidazolate framework ZIF-90 membrane for enhanced hydrogen selectivity*, Angew. Chem. Int. Ed., 2011, 50, pp. 4979-4982.
Husain, Shabbir, Mixed Matrix Dual Layer Hollow Fiber Membranes for Natural Gas Purification, Dissertation, Georgia Institute of Technology, Atlanta, GA, 2006, pp. 48-49.
Jang, Kwang-Suk, et al., *Modified mesoporous silica gas separation membranes on polymeric hollow fibers*, Chem. Mater., 2011, 23, pp. 3025-3028.
Jee, Sang Eun and David S. Sholl, *Carbon dioxide and methane transport in DDR zeolite: Insights from molecular simulations into carbon dioxide separations in small pore zeolites*, J. Am. Chem. Soc., 2009, 131(22), pp. 7896-7904.
Jie, Xingming, et al., *Gas permeation performance of cellulose hollow fiber membranes made from the cellulose/N-methylmorpholine-N-oxide/$H_2O$ system*, J. Appl. Polym. Sci., 2004, 91(3), pp. 1873-1880.
Kanezashi, Masakoto, et al., *Gas permeation through DDR-type zeolite membranes at high temperatures*, AIChE J., 2008, 54(6), pp. 1478-1486.
Koros, William J. and Rajiv Mahajan, *Pushing the limits on possibilities for large scale gas separation: Which strategies?*, J. Membr. Sci., 2000, 175, pp. 181-196.
Kuhn, Jelan, et al., *Detemplation of DDR type zeolites by ozonication*, Micropor. Mesopor. Mater., 2009, 120, pp. 12-18.

(56) References Cited

OTHER PUBLICATIONS

Kumar, P. et al., *Ordered mesoporous membranes: Effects of support and surfactant removal conditions on membrane quality*, J. Membr. Sci., 2006, 279, pp. 539-547.

Kusakabe, Katsuki, et al., *Formation of a Y-type zeolite membrane on a porous alpha-alumina tube for gas separation*, Ind. Eng. Chem. Res., 1997, 36(3), pp. 649-655.

Li, Shiguang, et al., *Scale-up of SAPO-34 membranes for $CO_2/CH_4$ separation*, J. Membr. Sci., 2010, 352, pp. 7-13.

Li, Yan-Shuo, et al., *Molecular sieve membrane: Supported metal-organic framework with high hydrogen selectivity*, Angew. Chem. Int. Edit., 2010, 49, pp. 548-551.

Li, Zong-Qun, et al., *Fabrication of nanosheets of a fluorescent metal-organic framework $[Zn(BDC)(H_2O)]_n$ (BDC=1,4-benzenedicarboxylate): Ultrasonic synthesis and sensing of ethylamine*, Inorganic Chemistry Communications, 2008, 11(11), pp. 1375-1377.

Lindmark, Jonas and Jonas Hedlund, *Modification of MFI membranes with amine groups for enhanced $CO_2$ selectivity*, J. Mater. Chem., 2010, 20(11), pp. 2219-2225.

Liu, Yunyang, et al., *Synthesis and characterization of ZIF-69 membranes and separation for $CO_2/CO$ mixture*, J. Membr. Sci., 2010, 353, pp. 36-40.

Liu, Yunyang, et al., *Synthesis of highly c-oriented ZIF-69 membranes by secondary growth and their gas permeation properties*, J. Membr. Sci., 2011, 379, pp. 46-51.

Liu, Xin-Lei, et al., *An organophilic pervaporation membrane derived from metal-organic framework nanoparticles for efficient recovery of bio-alcohols*, Angew. Chem. Int. Ed., 2011, 50(45), pp. 10636-10639.

Matsuda, H., et al., *Improvement of ethanol selectivity of silicalite membrane in pervaporation by silicone rubber coating*, J. Membr. Sci., 2002, 210(2), pp. 433-437.

McCarthy, Michael C., et al., *Synthesis of zeolitic imidazolate framework films and membranes with controlled microstructures*, Langmuir, 2010, 26(18), pp. 14636-14641.

Morris, William, et al., *Crystals as molecules: Postsynthesis covalent functionalization of zeolitic imidazolate frameworks*, J. Am. Chem. Soc., 2008, 130(38), pp. 12626-12627.

Nair, Sankar, et al., *Separation of close boiling hydrocarbon mixtures by MFI and FAU membranes made by secondary growth*, Micropor. Mesopor. Mater., 2001, 48, pp. 219-228.

Pachfule, Pradip, et al., *Solvothermal synthesis, structure, and properties of metal organic framework isomers derived from a partially fluorinated link*, Cryst. Growth Des., 2011, 11, pp. 1215-1222.

Pan, Yichang and Zhiping Lai, *Sharp separation of $C_2/C_3$ hydrocarbon mixtures by zeolitic imidazolate framework-8 (ZIF-8) membranes synthesized in aqueous solutions*, Chem. Commun., 2011, 47, pp. 10275-10277.

Parikh, Atul N., et al., *Non-thermal calcination by ultraviolet irradiation in the synthesis of microporous materials*, Micropor. Mesopor. Mater., 2004, 76, pp. 17-22.

Qiu, Wulin, et al., *Dehydration of ethanol-water mixtures using asymmetric hollow fiber membranes from commercial polyimides*, J. Membr. Sci., 2009, 327, pp. 96-103.

Sommer, Stefan and Thomas Melin, *Influence of operation parameters on the separation of mixtures by pervaporation and vapor permeation with inorganic membranes. Part 1: Dehydration of solvents*, Chem. Eng. Sci., 2005, 60, pp. 4509-4523.

Son, Won-Jin, et al., *Sonochemical synthesis of MOF-5*, Chem. Commun., 2008, 47, pp. 6336-6338.

Tomita, Toshihiro, et al., *Gas separation characteristics of DDR type zeolite membrane*, Micropor. Mesopor. Mater., 2004, 68, pp. 71-75.

Van Den Bergh, J., et al., *Separation and permeation characteristics of a DD3R zeolite membrane*, J. Membr. Sci., 2008, 316, pp. 35-45.

Van Den Bergh, Johan, et al., *Modeling permeation of $CO_2/CH_4$, $N_2/CH_4$, and $CO_2/Air$ mixtures across a DD3R zeolite membrane*, J. Phys. Chem., 2010, C, 114(20), pp. 9379-9389.

Venna, Surendar R. and Moises A. Carreon, *Highly permeable zeolite imidazolate framework-8 membranes for $CO_2/CH_4$ separation*, J. Am. Chem. Soc., 2010, 132(1), pp. 76-78.

Weh, K., et al., *Permeation of single gases and gas mixtures through faujasite-type molecular sieve membranes*, Micropor. Mesopor. Mater., 2002, 54, pp. 27-36.

Xomeritakis, George, et al., *Transport properties of alumina-supported MFI membranes made by secondary (seeded) growth*, Micropor. Mesopor. Mater., 2000, 38, pp. 61-73.

Xu, Gengsheng, et al., *Preparation of ZIF-8 membranes supported on ceramic hollow fibers from a concentrated synthesis gel*, J. Membr. Sci. 2011, 385-386, pp. 187-193.

Yan, Yushan, et al., *Preparation of highly selective zeolite ZSM-5 membranes by a postsynthetic coking treatment*, J. Membr. Sci., 1997, 123(1), pp. 95-103.

Yang, Lisha and Huimin Lu, *Microwave-assisted ionothermal synthesis and characterization of zeolitic imidazolate framework-8*, Chinese J. Chem., 2012, 30, pp. 1040-1044.

Yang, Qi-Liang, et al., *Synthesis of DDR-type zeolite in fluoride medium*, Chinese Journal of Inorganic Chemistry, 2009, 25(2), pp. 191-194.

Yao, Jianfeng, et al., *Contra-diffusion synthesis of ZIF-8 films on a polymer substrate*, Chem. Comm., 2011, 47, pp. 2559-2561.

Yoo, Won Cheol, et al., *High-performance randomly oriented zeolite membranes using brittle seeds and rapid thermal processing*, Angew. Chem. Int. Ed., 2010, 49, pp. 8699-8703.

Zhang, Yanfeng, et al., *Blocking defects in SAPO-34 membranes with cyclodextrin*, J. Membr. Sci., 2010, 358, pp. 7-12.

Zheng, Zhenkun, et al., *Synthesis, characterization and modification of DDR membranes grown on alpha-alumina supports*, J. Mater. Sci., 2008, 43, pp. 2499-2502.

International Search Report issued Feb. 23, 2012 for PCT/US2011/047769, 3 pages.

International Search Report issued May 25, 2012 for PCT/US2012/025080, 3 pages.

International Search Report issued Jul. 27, 2012 for PCT/US2012/025064, 4 pages.

International Search Report issued Nov. 6, 2012 for PCT/US2012/054817, 4 pages.

International Search Report issued Oct. 18, 2013 for PCT/US2013/042075, 16 pages.

\* cited by examiner

SCHEME 1

FIG. 6B

SCHEME 2

MOF NANOCRYSTALS

PRIOR RELATED APPLICATIONS

This application claims priority to U.S. Ser. No. 61/471,234, filed Apr. 4, 2011, and expressly incorporated herein by reference.

FEDERALLY SPONSORED RESEARCH STATEMENT

Not applicable.

FIELD OF THE INVENTION

This invention relates to metal organic framework (MOF) materials, more particularly a method for making MOF crystals that are less than a micron in size, and thus can be called "MOF nanocrystals."

BACKGROUND OF THE INVENTION

Metal Organic Frameworks (MOFs) are crystalline compounds consisting of metal ions or clusters coordinated to often rigid organic molecules to form one-, two-, or three-dimensional structures that can be porous. Describing and organizing the complex structures of MOFs could be a difficult and confusing task without a logical, unambiguous set of classifications. Recently, a system of nomenclature has been developed to fill this need. The inorganic sections of a MOF, or SBUs, can be described by topologies common to several structures. Each topology, also called a net, is assigned a symbol, consisting of three lower-case letters in bold. MOF-5, for example, has a pcu net. The database of net structures can be found at the Reticular Chemistry Structure Resource (rcsr.anu.edu.au).

Based on the combination of the building blocks, the length, the combination and the functionalization of the organic linker, a large variety of pore environments can be realized. Some interesting properties the MOFs exhibit include large surface areas, and relative ease of tuning and functionalizing. Furthermore, flexibility effects within the framework may be due to weaker bonds than those of zeolites. The unique properties observed in MOFs appear to have great potential mainly in applications related with gas storage and gas separations processes. For example, MOFs can be used to make a highly selective and permeable membrane to separate small gas molecules, particularly $CO_2$ from $CH_4$. This separation is necessary for natural gas purification and $CO_2$ capture, it is also difficult due to the two molecules being very similar in size. However, certain MOFs are well able to separate the two gases.

Zeolitic imidazolate frameworks (ZIF) are one kind of metal-organic framework, which can also be used to reduce industrial emissions of carbon dioxide. One liter of ZIF crystals can store about 83 liters of $CO_2$. The crystals are non-toxic and require little energy to create, making them an attractive possibility for carbon capture and storage. Further, the porous ZIF structures can be heated to high temperatures without decomposing and can be boiled in water or solvents for a week and remain stable, making them suitable for use in hot, energy-producing environments like power plants.

In order for these various MOF materials to be used in membranes (either as MOF films or as components in mixed matrix membranes), the crystal size is preferably less than one-micron. Since solvothermal synthesis typically produces crystals larger than 10 microns, other routes are needed to produce smaller crystals by increasing crystal nucleation while suppressing crystal growth.

It is also desirable to control the MOF morphology. In mixed matrix membrane applications, for example, anisotropic particles would lead to alignment of particles due to the flow fields associated with producing hollow fiber membranes. This situation can be avoided if more isotropic particles are used.

The three main techniques that have been applied to reduce MOF crystal size are sonication, microwave irradiation, and addition of a base. However, there is still room in the art for improved methods to synthesize MOF nanocrystals of uniform size.

SUMMARY OF THE INVENTION

This invention describes different methods to produce submicron MOF crystals of that are very important for gas separation applications. Generally, crystal size is suppressed with low temperature and/or sonication or by keeping the metal ligand separate from the linker precursors until fully dissolved and then adding the metal and an optional crystallization inhibitor.

One embodiment of the invention is a method of making submicron or nanosized MOF crystals, wherein ultrasound is combined with low temperatures and a morphology control additive (2-propanol and the like) to obtain smaller more isotropic crystals. The presence of a small amount of 2-propanol substantially alters the particle morphology from needles to a more isotropic shape and improves $CO_2$ absorption. Therefore, the Cu-hfipbb particles produced by this approach are suitable for use in applications involving fabrication of membranes and thin films.

In a second embodiment, ZIFs are made by first dissolving the ligand precursor in DMF or other suitable solvent and mixing for a time. In a second step, both a non-solvent and the metal ions are combined with the first mixture to make small ZIF crystals with a narrower size distribution. The "non-solvent" is a liquid in which the MOF precursors have a low solubility. Hence, upon introducing the non-solvent to the mixture, the precursors are unable to stay in solution and condense quickly to form a large number of nuclei, which then act as the seeds for growing a large number of very small crystals. In absence of the non-solvent, the number of nuclei are much smaller, and over time a small number of very large crystals grow from these nuclei. The non-solvent to be used will depend upon the particular MOF and the solubility of its precursors, and it is within ordinary skill to select a suitable non-solvent for use in this method. Furthermore, we have successfully used both methanol and water in this way. We also tried ethanol. Yield was increased compared to methanol, but particle size distribution was larger (~400 nm to 1.5 microns).

In a third embodiment, MOFs are made by making separate samples of i) metal ion plus solvent and ii) ligand precursor plus solvent plus a 2-10 fold excess of linker, preferably 2-5 fold excess, more preferably a 2-4 fold excess. These two mixtures are then combined to make small MOF crystals with narrow size distribution. The idea is again to keep the metal ion and the ligand (the two main constituents of the MOF) away from each other till the point that they are quickly mixed. This leads to the instantaneous formation of many nuclei, which are all of the similar size.

In previous approaches, by contrast, the metal and the ligand are initially mixed together or added to each other dropwise or over a period of time. This led to a large distribution in the size of nuclei and hence a large distribution in the resulting crystal sizes.

This method can also be combined with sonication, low temperatures and non-solvents to further reduce crystal size. Additionally, crystal size can be reduced by using a metal source containing a basic anion. The anion (such as acetate) induces nucleation while the excess protonated linker (terephthalic acid) inhibits growth, and is thus similar to the role of the nonsolvent.

The invention also includes the various MOF nanocrystals made according to the above methods, membranes containing same and applications using same.

By "non-solvent" herein what is meant is a liquid in which the MOF precursors have a low solubility, such that on introducing the non-solvent to the mixture, the precursors are unable to stay in solution and condense quickly to form a large number of nuclei, which are the seeds for growing a large number of very small crystals.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise," "have," "include" and "contain" (and their variants) are open-ended linking verbs and allow the addition of other elements when used in a claim.

The phrase "consisting of" is a closed linking verb and does not allow the addition of any other elements.

The phrase "consisting essentially of" occupies a middle ground, allowing the addition of non material elements such as extra washes, precipitations, drying or various buffers and the like.

The following abbreviations are used herein:

| | |
|---|---|
| BTC | 1,3,5-benzenetricarboxylate |
| Cu[(hfipbb)(H$_2$hfipbb)$_{0.5}$] or Cu-hfipbb | Cu(4,4'-hexafluoroisopropylidene-bis-benzoate) |
| CuBTC | Cu$_3$(BTC)$_2$ aka HKUST-1 |
| DI | Deionized water |
| DLS | Dynamic light scattering |
| MIL-53(Fe) | FeIII(OH)(O$_2$C—C$_6$H$_4$—CO$_2$) [Fe$_4$(OH)(O$_2$C—C$_6$H$_4$—CO$_2$)$_4$ per unit-cell |
| MOF | Metal organic framework |
| MOF-508b | Metal organic framework 508b |
| SEM | Scanning electron micrograph |
| SiO2 | Silica, source Ludox AS-30 colloidal silica |
| XRD | Xray diffraction |
| ZIF | Zeolitic imidazolate framework |
| ZIF-7 | Zeolitic imidazolate framework 7 |
| ZIF-8 | Zeolitic imidazolate framework 8 |
| ZIF-90 | Zeolitic imidazolate framework 90 |
| ZnBTC | Zinc BTC |

DESCRIPTION OF EMBODIMENTS OF THE INVENTION

Since there is a great need in the art for small and uniform MOF crystals, we have explored various methods of making nanosized MOF crystals. The methods can best be described as variations of techniques to promote the nucleation rate and reduce the growth rate.

In the first method, we combined sonication and low temperatures (−5 to 5° C., preferably about 0° C.) together with a morphology control additive (such as methanol, ethanol, 2-propanol and the like), in order to make submicron isotropic crystals of Cu-hfipbb.

We have also made uniform submicron ZIF-90 crystals using the "non-solvent" approach by separately adding both solvated metal and a non-solvent to pre-dissolved ligand in solvent mixture.

Finally, we have made MOFs by making a separate metal plus solvent mixture and a separate ligand precursor plus linker plus solvent mixture and then combining these two mixtures. Thus, in both cases, holding back the metal ions until the ligands and linkers were solvated, allowed a uniform size distribution of crystals to be made. A non-solvent can also be used in this method, as can low temperatures and sonication.

Another embodiment of the invention is a method of making nanosized MOF crystals comprising growing MOF crystals and increasing crystal nucleation, such that isotropic MOF crystals of average size less than one micron and a size distribution of less than +/−20% are obtained. Crystal nucleation is increased by keeping metal ions and ligand precursors separated until fully solvated and then quickly bringing them together or by agitation together with a crystal growth inhibitor and/or low temperatures or combinations thereof.

Membranes made with the MOF crystals are also enabled herein, wherein membranes can be made according to known methods in the art, including fabrication of continuous MOF membranes via secondary growth, by placing (or depositing) seed crystals onto e.g., a porous support followed by solvothermal treatment to grow them into a continuous MOF membrane. Other methods include incorporation of the MOF crystals into mixed-matrix gas-separation membranes, such as ZIF-90/6FDA-DAM membranes, or incorporation into hollow fibers or by film casting methods, and the like.

Methods of separating gases are also provided herein, the methods generally comprising subjecting a mixture of gases to the membranes made herein, and separating $CO_2$ from said mixture of gases, wherein said mixture of gases includes $CO_2$ plus at least one gas selected from $H_2$, $N_2$, $CH_4$, $O_2$ and combinations thereof. Other applications include gas separation, catalysis, drug delivery, optical and electronic applications, and sensing applications.

The following examples are illustrative only, and are not intended to unduly limit the scope of the invention.

EXAMPLE 1

Cu-hfipbb

Cu-hfipbb is a MOF composed of one dimensional cages (5.1 Å) joined by small windows (3.1 Å) with an exceptionally high predicted $CO_2/CH_4$ selectivity (~1000). The synthesis of Cu-hfipbb has several unusual features in comparison to most other MOFs. First, the control of hydrothermal synthesis is impeded by the marked hydrophobicity of one of the main reactants, H$_2$hfipbb. Only above 90° C. does one observe a solubility of H$_2$hfipbb high enough to form a clear aqueous solution. Second, the MOF formation requires a protonated H$_2$hfipbb ligand. Most MOF syntheses rely on a base to deprotonate a carboxylic acid, which then becomes incorporated into the MOF and creates a basic environment inside the MOF. As a result of these unique features, attempts to solvothermally synthesize Cu-hfipbb in an aprotic solvent (such as N,N-dimethylformamide) have unsuccessful. These two factors precluded the use of conventional methods to synthesize sub-micron Cu-hfipbb.

Because the published hydrothermal synthesis conditions result in crystals that are too large for membrane synthesis (~100/μm), one research group explored crystal synthesis by adding several organic solvents (e.g. methanol, ethanol, acetone, and dimethylformamide) to the Cu-hfipbb reaction mixture and found that methanol-water mixtures produced crystals with lower aspect ratios—in other word the crystals were less elongated and more isotropic.[3,4] However, nanocrystals were not obtained with any of the examined growth conditions.

Figure 1:
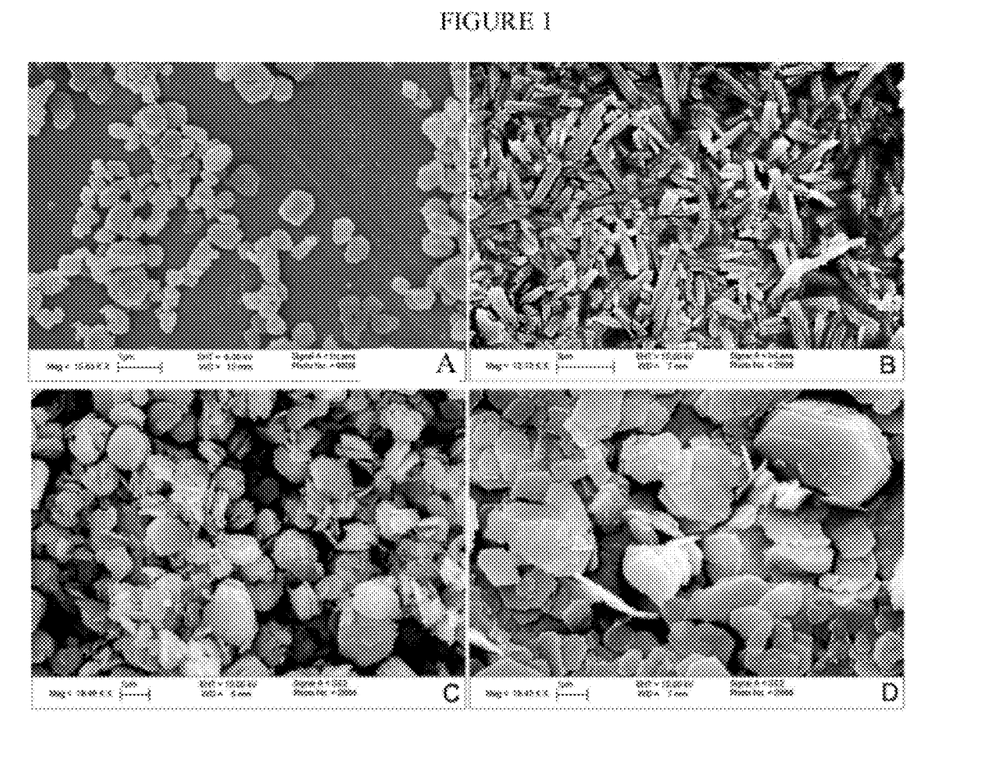
FIG. 1. SEM of Cu-hfipbb nanocrystal samples A-D (bar is one or three microns).

Submicron sized Cu-hfipbb was made in this example by combining low temperature crystal growth, ultrasound sonication and a morphology control additive to control crystal shape. By using sonication at 0° C. combined with a morphology control additive (2-propanol), submicron crystals of Cu-hfipbb were produced (FIG. 1).

DLS was performed to determine the average particle size of 660 nm with a 84 nm standard deviation (data not shown). The yields obtained were 0.13 grams of crystals per gram of ligand and 0.31 grams of crystals per gram of copper (II) nitrate used. This is the first reported synthesis of submicron Cu-hfipbb particles.

In more detail, reagents were used as purchased. 4,4'-(hexafluoroisopropylidene)bis(benzoic acid) (98%), copper (II) nitrate hemi(pentahydrate) (98%), and 2-propanol (99.5%) were purchased from SIGMA-ALDRICH.™ To synthesize Cu[(hfipbb)(H$_2$hfipbb)$_{0.5}$], 200 mg of H$_2$hfipbb was dispersed in 75 mL of deionized water by shaking and sonication. In a separate container, 79 mg of copper(II) nitrate hemi(pentahydrate) was dissolved in a 5 mL of water separately and added immediately before sonication. The molar ratio of copper nitrate to H$_2$hfipbb to water was 1:1.5:12900.

All syntheses were sonicated at intervals of 1 second on and 1 second off. Sonication was carried out with a SONICS VIBRACELL™ VCX 130 source equipped with a Model CV 18 horn operating at 20 kHz. Our detailed parametric studies are illustrated by four representative experimental conditions (labeled A-D and summarized in Table 1).

TABLE 1

Summary of synthesis conditions for the 4 samples of Cu[(hfipbb)(H$_2$hfipbb)$_{0.5}$]

|  | A | B | C | D |
|---|---|---|---|---|
| Synthesis time (hrs) | 6 | 6 | 6 | 1 |
| Temperature (° C.) | 0 | 0 | 0 | 90 |
| Percent 2-propanol | 1.2 | 0 | 1.2 | 1.2 |
| Sonicating power (W) | 91 | 91 | 26 | 91 |

For reaction conditions A, C, and D, 1 mL of 2-propanol was added. For reactions A, B, and D, the sonicating power was set at 91 W, and for reaction C it was set at 26 W. For syntheses A, B, and C, the reaction vessel was maintained inside a 3 L block of ice to keep the reaction temperature close to 0° C. for the 6.6 hour duration of the experiment. For synthesis D, the reaction container was placed on a hot plate and heated to 90° C. prior to and during the synthesis for 1 hour.

After synthesis, all samples were centrifuged and washed with 2-propanol to remove excess H$_2$hfipbb, and then washed in water. For purposes of comparison, Cu-hfipbb was also synthesized by the previously published hydrothermal method.

X-ray diffraction data were collected on a well aligned PANALYTICAL X'PERT PRO™ MPD with Cu Kα radiation (45 kV, 40 mA) and an X'CELERATOR™ detector. Pawley fits of the unit cell were carried out using the ACCELRYS™ package in MATERIALS STUDIO.™ Scanning electron microscopy (SEM) images were collected on a LEO1530™ operating at 10 kV. Light scattering measurements were made on a BROOKHAVEN INSTRUMENTS™ BI-APD detector equipped with a 632.8 nm/75 mW laser, using samples that were dispersed in hexane and with oleic acid added as a surfactant.

All samples were filtered through a 5 μm filter prior to DLS measurements. Thermogravimetric measurements were made on a NETZCH™ STA 449 F1 Jupiter with a AEOLOS™ QMS 403 C mass spectrometer with a heating rate of 10° C./min. CO$_2$ adsorption was carried out on a HIDEN-ISOCHEMA™ Intelligent Gravimetric Analyzer at 25° C. after activation for 4 hours under vacuum at 200° C.

TABLE 2

Summary of results from Dynamic Light Scattering measurements.

|  | A | B | C | D |
|---|---|---|---|---|
| Percent yield (%) | 11 | 7 | 7 | 40 |
| Average size (nm) | 660 | 692 | 794 | 571; 1713[a] |
| Standard deviation (nm) | 84 | 89 | 140 | 172; 589[a] |
| Scattering % < 1 μm | 88 | 80 | 80 | 49[b] |

[a]The size and standard deviation of both distributions of Sample D are shown, as they were comparable in size.
[b]Much of the sample appeared to have been trapped in the 5 μm filter and the true fraction of sub-micron particles may be even lower.

Scanning electron micrographs of samples from experimental conditions A-D are shown in FIG. 1. Sample A is the representative result that clearly shows the formation of submicron particles of Cu-hfipbb. The powder X-ray diffraction patterns from all four conditions A-D (not shown) show that Cu-hfipbb is produced. Only sample A, however, consists of pure Cu-hfipbb; samples B-D also contained a small amount of impurity phase associated with XRD peaks at 6.6, 8.7, and 11.5° 2θ. Although the assignment of these impurity peaks is currently unclear, it is worth noting that the impurity phase can also be synthesized by using the reaction conditions for sample A with stirring and no sonochemical energy input.

The yield of Cu-hfipbb in sample A was approximately 11% (Table 2). The yield for all syntheses was lower in comparison to other reports of sonochemically synthesized MOFs and of conventionally synthesized Cu-hfipbb. A number of factors may contribute to this reduced yield. A stoichiometric ratio of metal to ligand (1:1.5) was used, as opposed to other syntheses that used up to a four-fold excess of H$_2$hfipbb. In addition, the lack of solubility of H$_2$hfipbb in water meant that the amount of reactant in solution was low in comparison to sonochemical syntheses of other MOFs in which the ligand is dissolved in a suitable solvent. Sample D, synthesized at an elevated temperature, produced a yield of 40%, comparable to that of hydrothermal syntheses. For the other samples, the use of low temperature was designed to reduce the growth rate of the crystallites after crystal nucleation.

In summary, the growth rate appears to be controlled by the temperature, with higher temperatures resulting in a larger distribution of particle sizes. The phase purity of the crystal structure appears to be affected primarily by the sonicating power, but also by the presence of elevated temperatures during sonication. The particle geometry is influenced by the presence of 2-propanol, which acts as a "crystal-shape-directing" agent. In the absence of 2-propanol, Cu-hfipbb grows as long needle-like particles, but more isotropic particles are formed upon the addition of 1.2% 2-propanol.

The yields from the present method are comparable with those from hydrothermal synthesis on the basis of the amount of ligand used. The porosity and $CO_2$ uptake capacity of the sample is not reduced by sonochemical synthesis, indeed $CO_2$ capacity is somewhat improved on our crystals from 1.0 molecules of $CO_2$ per unit cell (0.76 mmol/g) for the hydrothermally synthesized sample to 1.1 molecules per unit cell (0.87 mmol/g) for sample A at 10 bar (data not shown).

Due to their sub-micron size and more isotropic shape, wherein a significant fraction of surface area exposes the nanopores of the material for uptake of gases, the present particles of Cu-hfipbb are suitable for use in membrane applications for the separation of gas and hydrocarbon mixtures.

It is hypothesized that the above method of crystal growth could be applied to additional carboxylate-based MOFs, because the sonication can increase nucleation while the low temperatures suppress the growth rate of the nuclei. Thus, the method has general applicability.

EXAMPLE 2

ZIF-90

ZIF-90 is a material composed of Zinc atoms linked through imidazolate carboxyaldehyde linkers to form a sodalite cage structure with 3.5 Å windows that has been shown to preferentially adsorb $CO_2$ over $CH_4$.

A closely related MOF, ZIF-8 was previously synthesized by mixing excess ligand with Zn at room temperature in methanol, but an analogous procedure for ZIF-90 did not yield small crystals due to the decreased solubility of the imidazole carboxyaldehyde linker in methanol. Furthermore, this ligand is soluble in DMF only after heating for at least 30 minutes.

One lab recently reported a ZIF-90 synthesis by heating the metal/ligand precursors in DMF and then adding a "non-solvent" to the cooled DMF solution, thus precipitating sub-micron ZIF-90 crystals. However, this method led to a size distribution with both small crystals of about 100 nm and larger crystals around 1 micron in size. One possible explanation for this size distribution is that prior to the addition of non-solvent, the metal and ligand were already coordinated forming particles with various sizes that grow non-uniformly until addition of non solvent.

Figure 2:
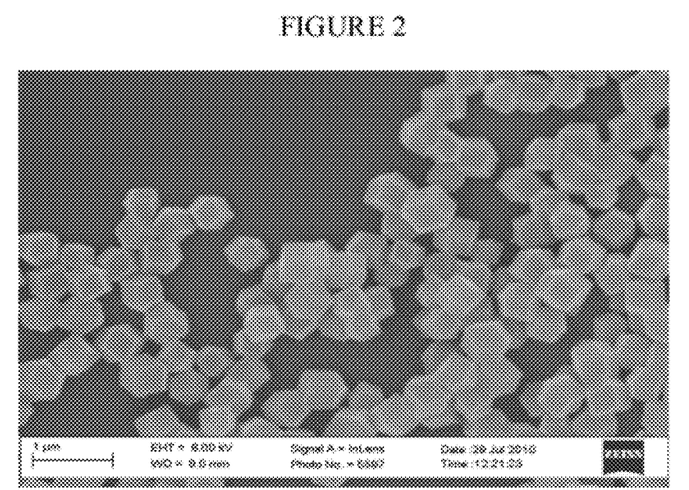
FIG. 2. SEM of ZIF-90 nanocrystals (bar is one micron).
Figure 6A:
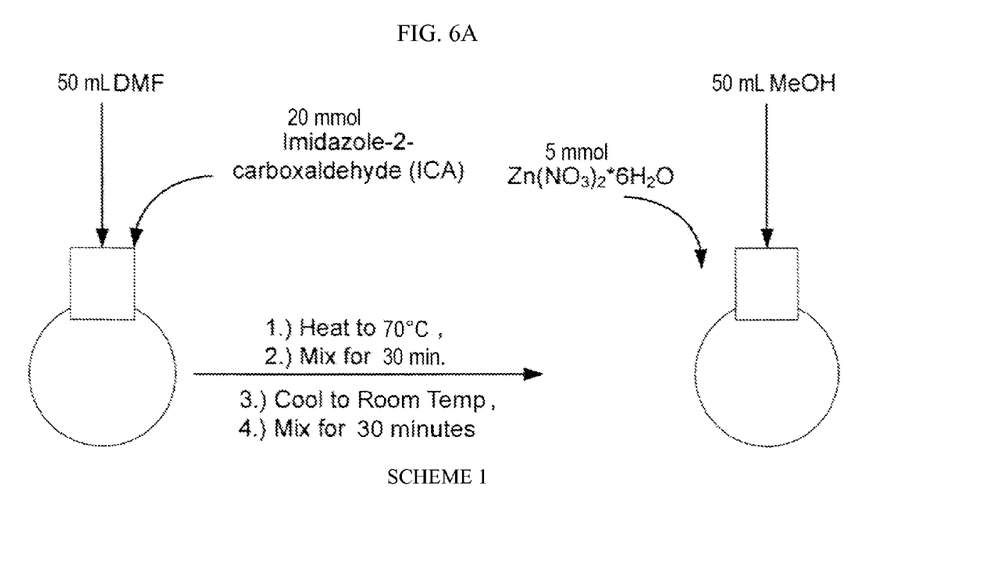
FIGS. 6A-6B. Reaction schemes of the present invention.

We have now discovered a method to make uniform sub-micron ZIF-90 crystals using the "non-solvent" approach by separately adding the solvated metal and non-solvent to the dissolved DMF plus ligand mixture (Scheme 1 as depicted in FIG. 6A). This method prevents the formation of particles until the addition of non-solvent. Prior to addition of non-solvent, only solvated ligands and metals exist in solution instead of coordinated metals and ligands as in the synthesis of Bae et al. By separating the zinc (or other metal) and imidazole carboxyaldehyde until the time of mixing in the non-solvent, small ZIF-90 crystals can be synthesized (FIG. 2) much quicker with a very narrow size distribution.

Based on DLS, the ZIF-90 particles made herein had an average size of 380 nm with a 16 nm standard deviation. The yield was 0.04 gram and 0.06 grams of crystals formed per gram of imidazole carboxyaldehyde ligand and zinc used, respectively.

EXAMPLE 3

MOF-508b

MOF-508b is another small-pore MOF consisting of zinc atoms linked via terephthalate and pillared with bipyridyl ligands to form 4 Å 1D channels.[10,11] While nanocrystals of this material could be synthesized by adding a base, such as triethylamine, it was difficult to isolate the proper phase as the subsequent triethylammonium ions can be incorporated in anionic frameworks as charge balancing ions.

Another group used a similar method with cobalt hydroxide as the metal base source to fabricate cobalt succinates to create phase diagrams, but no nanocrystals were reported. Instead of adding another chemical species to the reaction mixture (such as triethylamine), we have developed an approach that incorporated a metal salt with a basic anion; thereby, eliminating salt byproducts and suppressing formation of additional phases.

Figure 3:
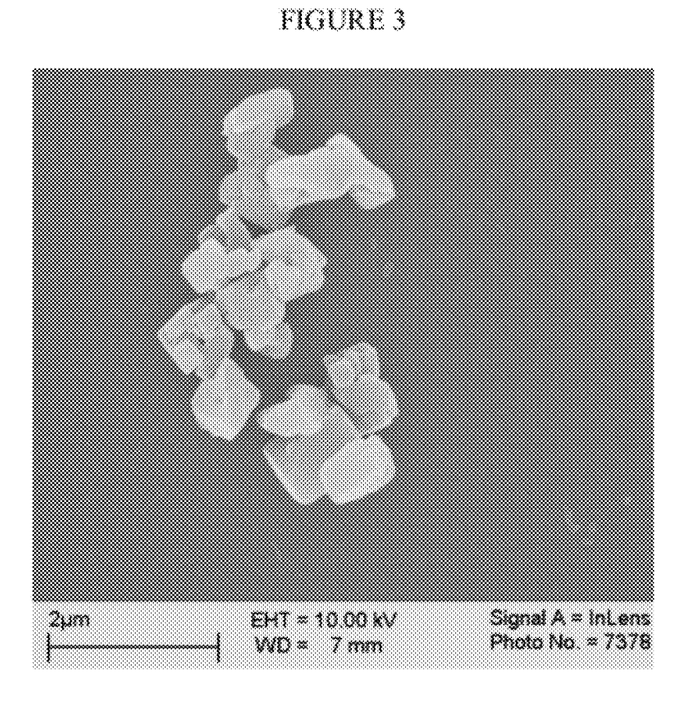
FIG. 3. SEM of MOF-508b (bar is two microns).
Figure 6B:
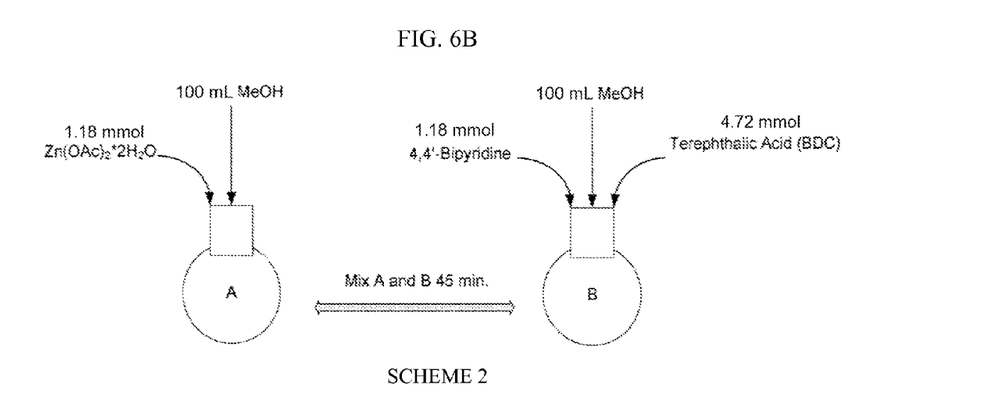

Specifically, nanocrystals of MOF-508b (Scheme 2 as depicted in FIG. 6B) could be formed at room temperature in methanol when using between 2 and 4 fold excess of terephthalic acid linker. Using the Smartiff software package to analyze MOF 508b crystals from SEM images, the average crystal size obtained was 832 nm with a 45 nm standard deviation (FIG. 3). This synthetic route produced 0.23 grams of crystals per gram of Zinc Acetate and 0.06 grams of crystals per gram of terephthalic acid used, respectively. This is the first reported synthesis of MOF-508b nanoparticles.

The MOF nanocrystals prepared herein can be used for any use that MOF crystals have traditionally been used for. One particular use is to make molecular sieve membranes, which can be used, e.g., for $CO_2$ removal e.g., from refinery or chemical plant waste or natural gas usage.

EXAMPLE 4

ZIF-7

In addition to ZIF-90, the nonsolvent method can also be used to synthesize ZIF-7 nanocrystals. ZIF-7 is a small-pore MOF material composed of zinc metal centers linked via benzimidazole ligands.[10] In a previous report, ZIF-7 nanocrystals were formed after suspending benzimidazole and zinc nitrate hexahydrate in DMF for 48 hours.[11]

Figure 4:
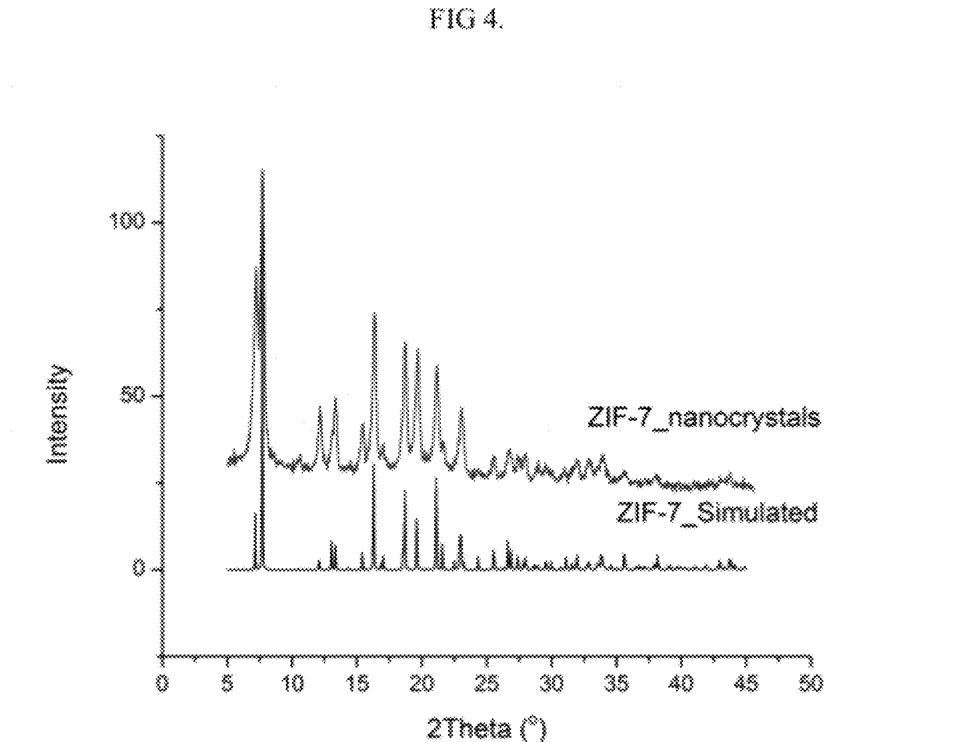
FIG. 4. PXRD pattern of submicron ZIF-7 Crystals.
Figure 5:
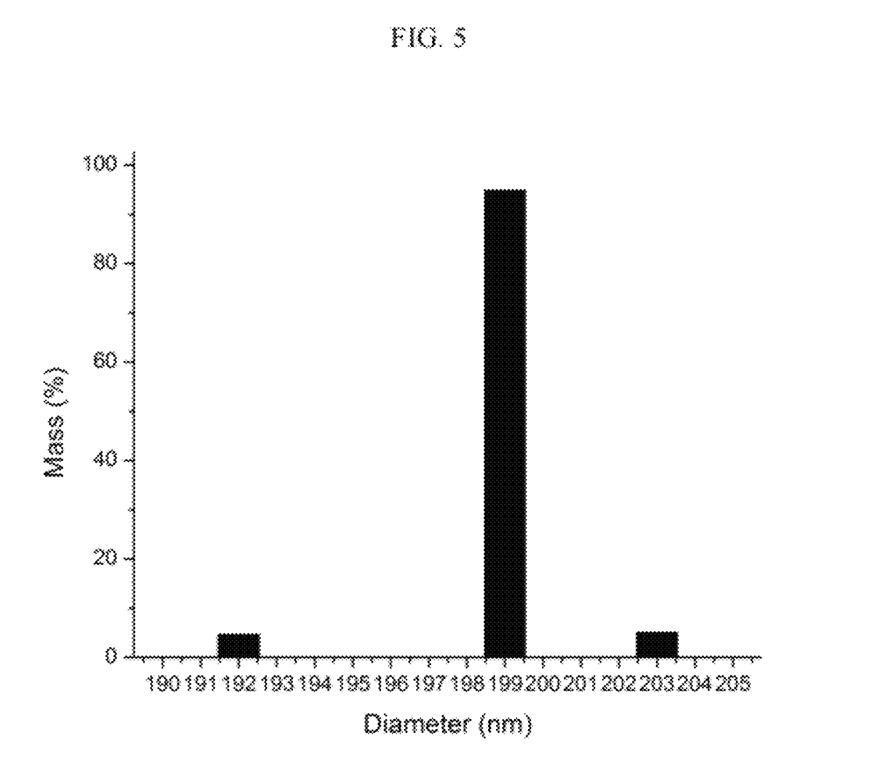
FIG. 5. DLS of ZIF-7 crystals.

Using our nonsolvent method, nanocrystals of ZIF-7 are synthesized by first dissolving 20 mmol of benzimidazole in 50 mL DMF followed by addition of 5 mmol zinc nitrate hexahydrate dissolved in 50 mL methanol. After mixing the DMF/benzimidazole and Methanol/Zinc solutions for 1 hr under vigorous stirring, phase-pure ZIF-7 nanocrystals are formed (see expected PXRD pattern in FIG. 4). The nonsolvent method produces ZIF-7 crystals approximately 199 nm with a 5 nm standard deviation based on DLS measurements (see FIG. 5). The yield of the synthesis is 0.33 gram and 0.53 gram of crystals formed per gram of benzimidazole ligand and Zinc used, respectively.

The following references are incorporated by reference in their entirety.

(1) Yaghi, O. M et al., J. Nature 2003, 423, 705.

(2) Watanabe, T. et al., Phys. Chem. Chem. Phys. 2009, 11, 11389.
(3) Ranjan, R.; Tsapatsis, M. Chemistry of Materials 2009, 21, 4920.
(4) Pan, L., et al., J. Am. Chem. Soc. 2004, 126, 1308.
(5) Li, Z. et al., Mater. Lett. 2009, 63, 78.
(6) Son, W. J., et al., Chem. Commun. 2008, 6336.
(7) Haque, E., et al., Inorg. Chem. Commun. 2008, 11, 1375.
(9) Morris, W., et al., J. Am. Chem. Soc. 2008, 130, 12626.
(10) Chen, B. L., et al., Chem.-Int. Edit. 2006, 45, 1390.
(11) Li, Y. S.; Liang, F. Y.; Bux, H.; Feldhoff, A.; Yang, W. S.; Caro, J. Angew. Chem.-Int. Edit. 2009, 48, 1.
(12) Ma, B. Q., et al., Inorganic Chemistry 2005, 44, 4912.
(13) Forster, P. M., et al., Chem.-Int. Edit. 2005, 44, 7608.

What is claimed is:

1. A method for preparing uniformly small MOF crystals, comprising the step of growing a MOF crystal with ultrasound at a temperature of −5 to 5° C. with a morphology control additive for a period of time so as to obtain isotropic MOF crystals of average size less than one micron and a size distribution of less than +/−20%.

2. The method of claim 1, wherein the morphology control additive is ethanol, or 2-propanol.

3. The method of claim 1, wherein size distribution is less than +/−10%.

4. The method of claim 1, wherein size distribution is less than +/−5%.

5. The method of claim 1, wherein the MOF is Cu(4,4'-hexafluoroisopropylidene-bis-benzoate) and the control additive is 2-propanol.

6. A method for preparing uniformly small MOF crystals, comprising:
   a) dissolving the ligand precursor in a suitable solvent and mixing;
   b) adding a non-solvent (for said ligand precursor) to the mixture in step a) and mixing;
   c) adding metal ions to the mixture in step b) and mixing, so as to make MOF crystals of average size less than one micron and the size distribution is less than +/−20%.

7. The method of claim 6, wherein size distribution is less than +/−10%.

8. The method of claim 6, wherein size distribution is less than +/−5%.

9. The method of claim 6, wherein the non-solvent is methanol or water.

10. The method of claim 6, wherein the MOF is ZIF-90 and the non-solvent is methanol.

11. The method of claim 6, wherein the MOF is ZIF-7 and the non-solvent is methanol.

12. A method for preparing uniformly small MOF crystals, comprising
   a) making a mixture of metal ion plus solvent;
   b) making a separate mixture of ligand precursor plus solvent plus 2-4 fold excess of linker;
   c) quickly combining samples a) and b) and mixing, so as to make MOF crystals of average size less than one micron and a size distribution of less than +/−20%.

13. The method of claim 11, wherein the size distribution is less than +/−10%.

14. The method of claim 11, wherein the size distribution is less than +/−5%.

15. The method of claim 11, wherein the MOF is MOF508b.

16. The method of claim 11, wherein the metal ion is a metal anion.

17. The method of claim 11, wherein the metal ion is a metal acetate.

18. A composition of MOF crystals that are less than one micron in average size (without having been size reduced after synthesis) and have a size distribution of less than +/−20%.

19. The composition of claim 18, having a size distribution of less than +/−10%.

20. A membrane comprising Cu(4,4'-hexafluoroisopropylidene-bis-benzoate) crystals of less than one micron average size (that are not size reduced after synthesis) plus a porous support.

21. A membrane comprising MOF508b crystals of less than one micron average size (that are not size reduced after synthesis) plus a porous support.

22. A membrane comprising ZIF-90 crystals of less than one micron average size (that are not size reduced after synthesis) plus a porous support.

23. A membrane comprising ZIF-7 crystals of less than one micron average size (that are not size reduced after synthesis) plus a porous support.

24. A method for preparing uniformly small MOF crystals, comprising the steps of:
   a) growing a MOF crystal with sonication at a temperature of −5 to 5° C. with a morphology control additive selected from ethanol or 2-propanol for a period of time; or
   b) b1) dissolving the ligand precursor in a suitable solvent and mixing for a time, b2) separately adding a non-solvent (for said ligand precursor) and metal ions with the mixture in step b1) and growing MOF crystals for a period of time; or
   c) c1) making a mixture of metal ion plus solvent, c2) making a separate mixture of ligand precursor plus solvent plus 2-5 fold excess of linker, quickly combining mixtures c1) and c2) and growing MOF crystals for a period of time; and
   d) said period of time sufficient to obtain isotropic MOF crystals of average size less than one micron and a size distribution of less than +/−20%.

25. A membrane comprising uniformly small MOF crystals, comprising the steps of:
   a) growing a MOF crystal with sonication at a temperature of −5 to 5° C. with a morphology control additive selected from ethanol or 2-propanol for a period of time; or
   b) b1) dissolving the ligand precursor in a suitable solvent and mixing for a time, b2) separately adding a non-solvent (for said ligand precursor) and metal ions with the mixture in step b1) and growing MOF crystals for a period of time; or
   c) c1) making a mixture of metal ion plus solvent, c2) making a separate mixture of ligand precursor plus solvent plus 2-5 fold excess of linker, quickly combining mixtures c1) and c2) and growing MOF crystals for a period of time; and
   d) said period of time sufficient to obtain isotropic MOF crystals of average size less than one micron and a size distribution of less than +/−20%.

26. A method of separating $CO_2$ from other gases, comprising subjecting a mixture of gases to the membrane of claim 25, and separating $CO_2$ from said mixture of gases, wherein said mixture of gases includes $CO_2$ plus at least one gas selected from $H_2$, $N_2$, $CH_4$, $O_2$ and combinations thereof.

27. A method of making nanosized MOF crystals, said method comprising growing MOF crystals and increasing crystal nucleation, such that isotropic MOF crystals of average size less than one micron and a size distribution of less than +/−20% are obtained, wherein crystal nucleation is increased by keeping metal ions and ligand precursors separated until fully solvated and then quickly bringing them together or by agitation plus a crystal growth inhibitor or combinations thereof.

* * * * *